(12) United States Patent
Brok et al.

(10) Patent No.: US 10,597,016 B2
(45) Date of Patent: Mar. 24, 2020

(54) BRAKE SYSTEM FOR A MOTOR VEHICLE (71) Applicant: AUDI AG, Ingolstadt (DE)

(72) Inventors: Tobias Brok, Kösching (DE); Herbert Ernst, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 23 days.

(21) Appl. No.: 15/808,320

(22) Filed: Nov. 9, 2017

(65) Prior Publication Data
US 2018/0141531 A1 May 24, 2018

(30) Foreign Application Priority Data
Nov. 21, 2016 (DE) .................. 10 2016 222 859

(51) Int. Cl.
| *F16D 65/28* | (2006.01) |
| *B60T 13/74* | (2006.01) |
| *B60T 8/40* | (2006.01) |
| *F04B 1/00* | (2020.01) |
| *F04B 17/05* | (2006.01) |
| *F04B 17/00* | (2006.01) |

(52) U.S. Cl.
CPC .......... *B60T 13/746* (2013.01); *B60T 8/4018* (2013.01); *B60T 8/4081* (2013.01); *B60T 13/745* (2013.01); *F04B 1/00* (2013.01); *F04B 17/00* (2013.01); *F04B 17/05* (2013.01)

(58) Field of Classification Search
CPC .......... F16D 65/14; F16D 65/18; B60T 7/042; B60T 8/17; B60T 11/24; B60T 13/58; B60T 13/128; B60T 13/167; B60T 13/745

USPC ..... 188/358–360, 364, 368, 369, 71.2, 72.2, 188/72.4, 72.6, 156–164; 303/114.1, 303/114.3
See application file for complete search history.

(56) References Cited

U.S. PATENT DOCUMENTS 3,065,604 A * 11/1962 Randol ................... B60T 11/20
60/570
3,220,189 A * 11/1965 Caramanna ............. B60T 11/06
60/581
(Continued)

FOREIGN PATENT DOCUMENTS

| CN | 105711576 A | 6/2016 |
| CN | 105730428 A | 7/2016 |

(Continued)

OTHER PUBLICATIONS

German Search Report dated Jun. 9, 2017 of corresponding German application No. 102016222859.5; 10 pgs.
(Continued)

*Primary Examiner* — Christopher P Schwartz
(74) *Attorney, Agent, or Firm* — Maier & Maier, PLLC (57) ABSTRACT

A brake system for a motor vehicle. A braking pressure source and at least one wheel brake, which can be impinged by brake pressure provided by the brake pressure source. The brake pressure is provided with at least one pressure piston arranged so that it is linearly displaceable in a pressure cylinder, and with an engine for displacing the pressure piston in the engine which is coupled to pressure piston via a gear. At the same time the gear is provided with force transmission paths which are at least partially parallel to each other and arranged in an operative connection between the engine and the pressure piston.

6 Claims, 4 Drawing Sheets

(56) References Cited

U.S. PATENT DOCUMENTS

| | | | | |
|---|---|---|---|---|
| 3,612,619 | A * | 10/1971 | Hayes | B60T 7/12 180/286 |
| 4,604,870 | A * | 8/1986 | Bach | B60T 13/145 60/551 |
| 6,484,608 | B1 * | 11/2002 | Ziavras | B64G 1/66 74/810.1 |
| 6,959,637 | B1 * | 11/2005 | Penninger | B60T 13/569 91/369.2 |
| 8,292,042 | B2 * | 10/2012 | Kim | F16D 65/18 188/162 |
| 9,139,186 | B2 * | 9/2015 | Vollert | B60T 13/745 |
| 9,188,182 | B2 * | 11/2015 | Park | F16D 65/18 |
| 9,447,831 | B2 * | 9/2016 | Goh | F16D 65/18 |
| 9,476,470 | B2 * | 10/2016 | Park | F16D 55/225 |
| 9,726,265 | B2 * | 8/2017 | Gaffe | F16H 19/04 |
| 9,776,604 | B2 * | 10/2017 | Lee | B60T 1/10 |
| 9,802,590 | B2 * | 10/2017 | Drumm | B60T 7/042 |
| 9,815,445 | B2 * | 11/2017 | Cann | B60T 13/746 |
| 2010/0126167 | A1 * | 5/2010 | Nagel | B60T 7/042 60/545 |
| 2011/0253490 | A1 * | 10/2011 | Vollert | B60T 13/745 188/156 |
| 2011/0291469 | A1 * | 12/2011 | Drumm | B60T 8/4077 303/2 |
| 2012/0042647 | A1 | 2/2012 | Vollert et al. | |
| 2015/0183414 | A1 | 7/2015 | Kobayashi et al. | |
| 2015/0197231 | A1 * | 7/2015 | Winkler | B60T 13/741 303/3 |
| 2015/0274144 | A1 | 10/2015 | Tokoi et al. | |
| 2015/0354651 | A1 * | 12/2015 | Park | F16D 55/225 188/72.1 |
| 2016/0264117 | A1 * | 9/2016 | Deng | B60T 11/18 |
| 2018/0273011 | A1 * | 9/2018 | Wingender | B60T 13/745 |

FOREIGN PATENT DOCUMENTS

| | | |
|---|---|---|
| CN | 105882639 A | 8/2016 |
| DE | 102004024403 A1 | 12/2005 |
| DE | 102008039306 A1 | 5/2009 |
| DE | 102013224870 A1 | 9/2014 |
| KR | 2011-0120294 A | 11/2011 |
| KR | 10-2014-0003839 A | 1/2014 |
| KR | 10-2016-0080634 A | 7/2016 |

OTHER PUBLICATIONS

Korean Office Action dated Sep. 20, 2018, in connection with corresponding KR Application No. 10-2017-0154545 (16 pgs., including English translation).

Chinese Office Action dated Nov. 1, 2019, in connection with corresponding CN Application No. 1 201711146510.X (14 pgs., including machine-generated English translation).

Office Action dated Mar. 19, 2019 in corresponding Korean Application No. 10-2017-0154545; 18 pages.

* cited by examiner

BRAKE SYSTEM FOR A MOTOR VEHICLE

FIELD

The invention relates to a brake system for a motor vehicle provided with a braking pressure source and at least one wheel brake which can be impinged by brake pressure provided by means of a brake pressure source, wherein the brake pressure source is equipped with at least one pressure piston arranged so that it is linearly displaceable in a pressure cylinder, and with a motor for displacing the pressure piston within the pressure cylinder, wherein one drive shaft of the engine is coupled by means of a transmission to the pressure piston.

BACKGROUND

The brake system serves to decelerate the motor vehicle and thus it also provides a braking force that is acting on at least one wheel of the motor vehicle. The braking force is applied to the wheel by means of the wheel brake. When the vehicle has several wheels, the brake system pressure is preferably applied to several of these wheels, or to all of these wheels to which brake pressure or actual brake pressure is supplied. In this respect, the brake system is provided as a service brake of motor vehicle, or it forms at least a component of the brake system.

The brake system is preferably provided with a main brake cylinder in which a main brake piston is arranged in a displaceable manner. The main brake piston delimits together with the main brake cylinder the volume of the brake fluid, which is variable, while its amount depends on the position of the main brake system. The main brake piston is coupled to an operating element, which is provided for example in the form of a brake pedal. The driver of the motor vehicle can set a desired braking force by means of the operating element, which is then designated for a predetermined braking force and preferably has a fixed correlation to a predetermined brake pressure.

The brake system is preferably provided as an electro-hydraulic brake system. This means that in at least one operating mode of the brake system, the available volume of the brake fluid does not provide the actual braking pressure immediately upon the actuation of the wheel brake, or provides only a part thereof. Instead, a desired brake pressure is determined during the actuation of the operating element, which can be realized with the aid of at least one sensor that is associated with the operating element and/or with main brake piston and/or with the main brake cylinder and/or with a simulator cylinder at which a simulator piston is arranged or to which it is assigned in a displaceable manner.

The sensor can be for example designed as a displacement sensor or as a pressure sensor. In the first case, the actuating distance of the operating element is determined by means of the sensor, so that the operating element is displaced during its actuation. In addition or as an alternative, it is of course also possible to determine the pressure that is present in the main braking cylinder by means of the sensor. The desired pressure is then determined from the variables that are measured by the sensors, which is to say for example the path and/or the pressure. Subsequently, an actual pressure is applied or set to the wheel brake which corresponds to the desired brake pressure.

The desired brake pressure is provided by the brake pressure source, which is present for example in the form of a pump, in particular a pump that is operated electrically.

According to the operating mode described above, the brake system is not connected to the wheel brake, or at least it is not connected directly, or it is fluidly connected. In order to nevertheless provide a haptic feedback for the driver of the motor vehicle during the actuation of the operating element, it is preferred when and optional brake force simulator is associated with the main brake cylinder. This simulator is provided with the simulator piston, which is arranged in a displaceable manner in a simulator cylinder and supported via a spring element on a wall of the simulator cylinder and in this respect subjected to filtering force.

The simulator piston delimits together with the simulator cylinder a simulator cylinder fluid volume, which is variable similarly to the brake fluid volume, wherein the amount of the simulator fluid volume depends on the position of the simulator piston. The simulator fluid volume is fluidically connected with the brake fluid volume. When the operating element is actuated, the brake fluid volume is reduced and the brake fluid that is contained to the brake fluid volume is supplied to the simulator fluid volume. Accordingly, the simulator fluid volume is increased, whereby the simulator piston is deflected in response to the spring force.

Depending on the spring force, which can in turn depend on the deflection of the simulator piston, a counter-force acts in the operating mode described above as a result of the fluidic connection between the simulator fluid volume and the brake fluid volume on the operating element, which is oriented in the opposite direction to the operating force that is applied to the operating element. As a result, the driver receives a haptic signal via the operating element, which is essentially dependent on the deflection of the operating element from its starting position or rest position.

In order to provide a rebound plane in the event of a defect of the brake system, for example in the event of a defect of the brake pressure source, a direct fluidic connection is preferably provided between the main brake cylinder and the wheel brake. The actual pressure can thus be rebuilt in this manner on the wheel brake in case of a defect of the brake system when the operating element is actuated. For this purpose, however, the driver must apply a substantially greater operating force to the operating element than is customary.

The brake pressure source is provided with the pressure cylinder and the pressure piston, wherein the pressure piston is linearly arranged in a displaceable manner in the pressure cylinder. The arrangement of the pressure piston inside the pressure cylinder is accomplished by means of the engine, which is preferably provided as an electric engine. However, it goes without saying that another design of the engine can be also realized. The engine or the drive shaft of the engine is coupled via the transmission to the pressure piston. The transmission in this case serves for converting a rotary movement of the drive shaft to a linear displacement of the pressure piston. The transmission can be thus also referred to a as a translatory gear.

In particular with an autonomous driving operation, which is to a partially autonomous or a fully autonomous driving operation of the motor vehicle, it must be ensured that the actual brake pressure can be built up on the wheel brake by means of the brake pressure source because under some circumstances the driver may not be able to provide the rebound plane described above, for example because he is not on the board of the motor vehicle but instead he may be outside of the vehicle, or he may be present on the board of the vehicle but not in a position in which to actuate the operating element.

SUMMARY

The object of the invention is therefore to propose a brake system for a motor vehicle which provides advantages over known brake systems, in particular with a very high reliability of the brake pressure source in case of a failure.

This is achieved according to the invention with a brake system which has the features of the disclosure. At the same time, it is provided that the transmission has in the operative connection between the engine and pressure at least partial transmission paths which are parallel to each other.

The displacement of the engine in the manner described above is carried out by means of the transmission with the pressure piston, so that the rotary movement of the engine or of its drive shaft is converted into a translatory or linear displacement of the pressure piston. In this respect, the engine is operationally connected with the pressure piston by means of the transmission. If the transmission is damaged, the operative connection is lost, so that the functionality of the brake pressure source is no longer ensured. The damage can occur for example in the form of a mechanical damage of the transmission, for example in the form of a damage that is caused to a toothed wheel of the transmission.

In order to prevent such a failure of the operative connection, the transmission should be provided at least in some areas with force transmission paths that are parallel to each other. Torque transmission can thus take place by means of each of the force transmission paths that is parallel to the respective other path or to the respective other paths, so that consequently, the effective connection between the motor and the pressure piston can be maintained.

An independent operative connection is preferably realized between the engine and the pressure piston. However, the force transmission paths can alternatively bridge over only a part of the transmission, preferably a part which is subjected to a high mechanical stress. It is preferred when each of the path transmission paths is on the one hand coupled to the engine or its drive shaft, and on the other hand coupled also to the pressure piston, so that in the event of a failure of a the force transmission path, at least one more transmission path will still be available for maintaining an operative connection between the engine and the pressure piston.

In the context of a preferred embodiment it is provided that a first path among the transmission paths extends via a first transmission shaft, and that a second path among the force transmission paths then extends via a second transmission path. Both transmission paths, which is to say the first transmission path and the second transmission paths, are arranged parallel to each other, independently of each other and independently of the torque to be transmitted through these paths. Each of the transmission shafts is rotatably mounted about their respective rotational axes. These rotational axes may be arranged parallel to each other, but they do not necessary need to be arranged in this manner. For example, an angled or a skewed orientation of the rotational axes may be also realized. It is preferred when on the one hand, each of the transmission shafts is engaged at the engine or its drive shaft, and on the other hand it is engaged on the pressure piston, or on a push rod of the pressure piston.

According to a further development of the invention it is provided that the first transmission shaft and the second transmission shaft are arranged parallel to each other. This has already been pointed out above. On the one hand, both transmission shafts are arranged parallel with respect to the torque transmitted through them, which means that they form force transmission paths that are mutually parallel to each other. On the other hand, their rotational axes are preferably arranged parallel and at a distance to each other.

According to a preferred embodiment of the invention it is provided that the first transmission shaft and the second transmission shaft are provided so that are respectively coupled to the drive shaft via a coupling gear, in particular a worm gear. In this respect, a first coupling gear is provided for the first transmission shaft and a second coupling gear is provided for the second transmission shaft, wherein both coupling gears can share individual elements. So for example, it is provided that a common gear element is assigned to the engine or the drive shaft, for example a toothed weal or a worm of the worm gear. Each of the transmission shafts is in this case assigned to another gear element, for example a toothed wheel, which meshes with or is engaged by the first-mentioned gear element.

When the design of the coupling gear is in the form of a worm gear, it is preferably provided that the other gear elements of the first transmission shaft and of the second transmission shaft cooperate with the gear elements assigned to the engine from different sides, in particular from opposite sides. In this case, the other transmission elements of the transmission shafts are preferably designed as spur wheels which are provided with an outer toothing that meshes with the worm gear toothing of the worm gear, wherein the worm gear is rigidly connected to the drive shaft of the engine and optionally built on it. By means of the worm gear, the torque provided by the engine is transmitted to the first transmission shaft and to the second transmission shaft independently of one another.

According to another preferred embodiment it is provided that the first transmission shaft is coupled via a first translatory gear to the pressure piston, in particular to a push rod engaging at the pressure piston. Both translatory gears, which is to say the first translatory gear and the second translatory gear, form components of the parallel force transmission paths. For example, the first transmission shaft is coupled to the pressure piston independently of the second transmission shaft and vice versa. Preferably, the transmission shafts engage via the translatory gears the push rod, which preferably forms a component of the pressure piston.

According to a preferred embodiment of the invention it is provided that the first translatory gear is provided with a first toothed wheel that is connected with the first translatory gear and with a first gear rack meshing with the first toothed wheel, and the second translatory gear is provided with a second toothed wheel connected to the second transmission shaft and with a second gear rack meshing with the second toothed rack of the wheel. Each of the translatory gear is equipped with the toothed wheel and with a gear rack that is meshing with it. The gear rack is coupled directly to the pressure piston, or connected or coupled to the push rod, so that a rotary movement of the respective transmission shaft and thus also of the corresponding toothed wheel causes a linear displacement of the pressure piston. It is preferred when the toothed wheel, which is to say the first toothed wheel or the second toothed wheel, is formed in one piece with the respective transmission shaft. For example, the toothed wheel is formed on the respective transmission shaft, in particular by machining.

Within the scope of another embodiment of the invention it is provided that the first gear rack and the second gear rack are designed as common gear racks, wherein the toothing of the first gear rack is arranged on the first side of the common gear rack, and the toothing of the second gear rack is arranged on the second side of the common gear rack, which is different from the first side. Both gear racks, which is to say the first gear rack and the second gear rack, are designed as common gear racks and are thus provided for example in the form of a unit consisting of the same material and/or in one piece. It goes without saying that both gear racks can be also provided separately from each other on a basic body, for example the push rod.

It is only important in this case that the toothings of both gear racks are provided on different sides, so that the toothed wheel of the translatory gear to which the gear racks belong engages the gear racks on different sides. It is preferred when the toothings of the gear racks are arranged on opposite sides. In other words, the toothings are arranged on different sides of an imaginary plane. The common gear rack can be provided in the form of a push rod or it can be formed on it. In any case, however, the common gear rack is rigidly connected to the pressure piston.

According to a preferred embodiment of the invention, an epicyclic gearbox is equipped with a ring gear, as well as with a sun wheel and with a planetary wheel carrier carrying a plurality of planetary gears, wherein each of the planetary wheels meshes on one side with the ring wheel, and on the other side with the sun wheel. The epicylic gearbox has as usual components the ring wheel, the sun wheel and the planetary gear carrier. Several planetary gears are rotatably mounted on the planetary gear carrier, wherein each of the planetary gears is meshing with the ring wheel as well as with the sun wheel. Therefore, independent parallel force transmission paths are established between the ring wheel and the sun wheel by means of the planetary wheels.

The ring wheel or the sun wheel, preferably the former, is coupled to the engine or to its drive shaft, preferably rigidly and/or permanently. An operative connection to the pressure piston is created by means of another wheel, preferably the sun wheel, for example so that the sun wheel or a toothing that is formed on it meshes with the pressure piston or the push rod.

According to another embodiment of the invention it is provided that the sun wheel is coupled to the pressure piston, in particular to the engaging push rod on the pressure piston. This has been already pointed out above. The translationary gear serves to convert the rotational movement of the wheel to the linear movement of the pressure piston. An operative connection is thus created by means of the translationary gear between the sun wheel and the pressure system, preferably a rigid and/or permanent connection.

Finally, it can be provided within the context of another embodiment of the invention that the translationary gear has an internal toothing of the sun wheel and an external toothing which meshes with the internal toothing of the sun wheel, which is in particular formed on the push rod. The internal toothing and the external toothing which is meshing with it are designed in such a way that the rotary movement of the sun wheel causes a linear displacement of the pressure piston, or of the push rod.

For example, the external toothing, or the external toothing, or both of them can be designed as oblique toothings.

BRIEF DESCRIPTION OF THE FIGURES

The invention will be explained in more detail below with reference to the embodiments illustrated in the figures, without limiting the invention. The figures show the following.

DETAILED DESCRIPTION OF THE FIGURES

Figure 1:
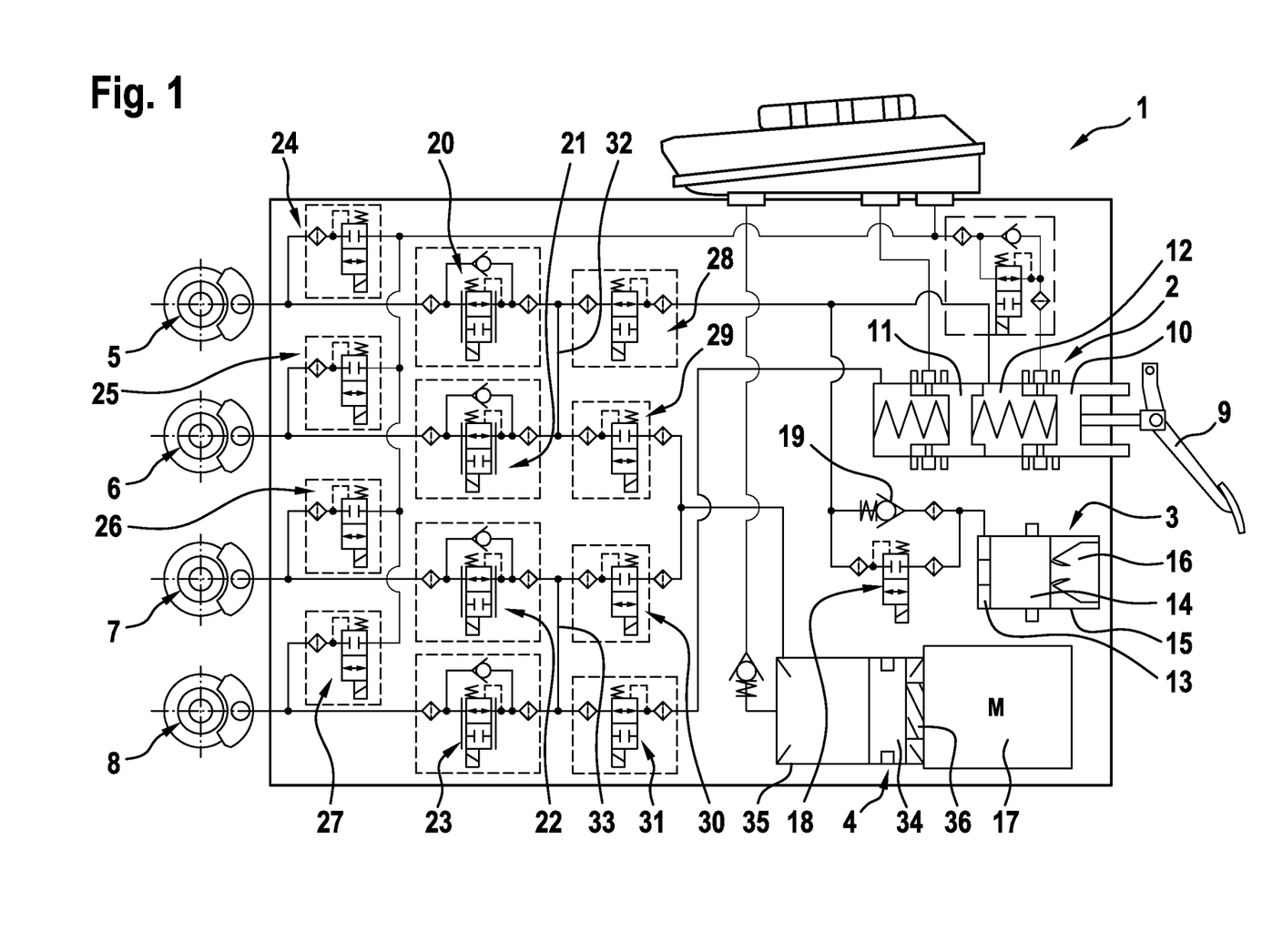
FIG. 1 a schematic representation of a brake system for a motor vehicle, as well as FIG. 2 a schematic representation of a region of a brake pressure source of the brake system.

FIG. 1 shows a schematic representation of a brake system 1, which is equipped with a main brake cylinder 2, a brake force simulator 3, a brake pressure source 4, as well as with wheel brakes 5, 6, 7 and 8. The number of the wheel brakes is of course arbitrary. In the embodiment illustrated here, four wheel brakes 5, 6, 7 and 8 are provided, but a higher or a lower number of the brakes can be also provided. In the illustrated embodiment, the wheel brakes 5 and 7 assigned to the wheels of a first wheel axle, in particular a front axle, and the wheel brakes 6 and 8 are assigned to the wheels of a second axle, in particular a rear axle of the motor vehicle.

An operating element 9 is associated with the main brake cylinder 2, which is here designed as a brake pedal. The operating element 9 is coupled with a main brake piston 10, for example via a lever connection. The main brake piston 10 is arranged in a displaceable manner on the main brake cylinder 2. In the illustrated embodiment here, a further brake piston 11 is arranged in addition to the main brake 10 in the main brake cylinder 2. However, this is optional.

The main brake piston 10 includes together with the main brake cylinder 2 a brake fluid volume 12. This volume is fluidically connected to a simulator fluid volume 13 of the brake force simulator 3. The simulator volume 13 is delimited by a simulator piston 14, together with a simulator piston 15 in which the simulator piston is arranged in a displaceable manner. The simulator 14 is preferably subjected to the spring force of at least one spring element 16. The spring element causes a spring force on the simulator piston 14, which is oriented so that it is opposed to an enlargement of the simulator fluid volume 13.

To the main cylinder 2 and/or the operating element 9 is assigned a sensor, not shown here, by means of which an actual brake pressure is determined with the actuation of the operating element 9. After that, the actual pressure generated by means of the brake pressure source 4 is applied to at least one of the wheel brakes 5, 6, 7 and 8, which corresponds to the actual brake pressure. The brake pressure source 4 is here preferably designed as a pump by means of which an electric engine 17 is driven or can be driven.

A switching valve 18 is arranged for fluidic control between the brake fluid volume 12 and the simulator fluid volume 13. Fluidically parallel to the switching valve 18 is arranged a check valve 19. The check valve is designed in such as way that it opens in the direction of the wheel brake 5, 6, 7 or 8, which is to say that it allows the flow from the simulator fluid volume 13, but prevents the flow into the simulator fluid volume 13.

The brake system 1 is used to illustrate the operation of the operating brake of the motor vehicle. Each of the wheel brakes 5, 6, 7 and 8 is respectively assigned to an inlet valve 20, 21, 22, or 23, as well as to an outlet valve 24, 25, 26 or 27. The brake fluid that is provided by the brake pressure source 4 can be supplied by means of the inlet valve 20, 21, 22 and 23 to the respective wheel brakes 5, 6, 7 and 8. On the other hand, the outlet valves 24, 25, 26 and 27 are used to remove the brake fluid from the respective wheel brakes 5, 6, 7 and 8, in particular in the direction of a storage container 28 and/or of the brake fluid volume 12.

Furthermore, the brake system 1 is also provided with separating valves 28, 29, 30 and 31. The separating valves 28 and 29 are assigned to the wheel brakes 5 and 6, while the separating valves 30 and 31 are assigned to the wheel brakes 7 and 8. Downstream of the separating valves 28, 29 on the on hand and of the separating valves 30 and 31 on the other hand is located a respective transverse connection 32 or 33, by means of which the sides of the separating valve 28 and 29 facing the wheel brakes 5 and 6 or the separating valves are fluidically connected to each other. It is evident that wheel brakes 5 and 6 can be fluidically connected via the separating valve 29 and the wheel brakes 7 and 8 via the separating valve 30 to the brake pressure source 4.

It is evident that the electric engine 7 is operatively connected to a pressure piston 34, which is linearly arranged in a displaceable manner in a pressure cylinder 35 of the brake pressure source 4. The operative connection between the pressure piston 34 and the electric engine 17 preferably extends in this case through a push rod 36, which is only indicated here by way of an example.

Figure 2:
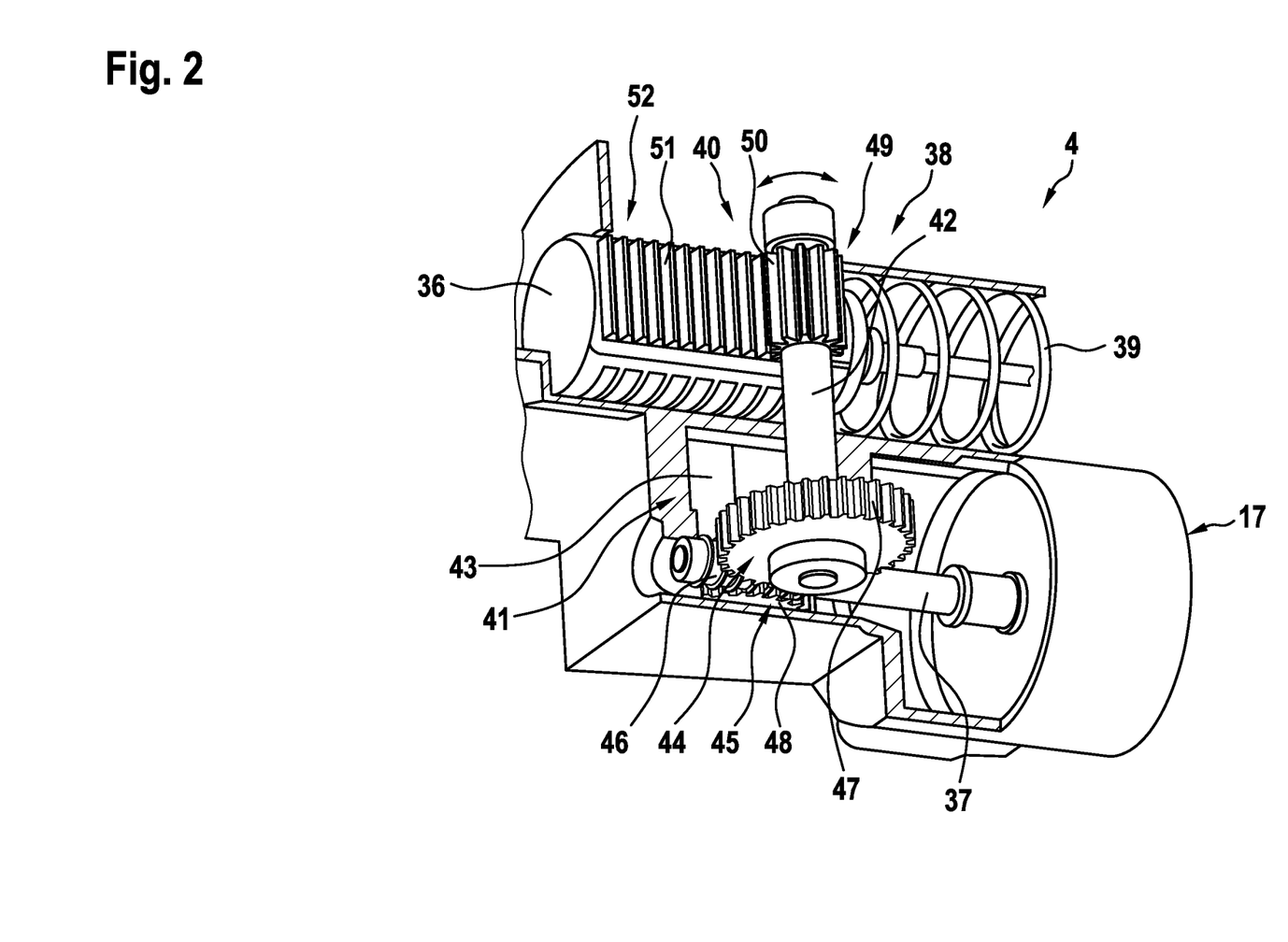

FIG. 2 shows a schematic representation of a region of the brake pressure source 4. The figure shows in particular the electric engine 17, which is provided with a drive shaft 37. The electric engine 17 or its drive shaft 37 is coupled via a transmission 38 to the pressure piston 34 or its push rod 36, preferably rigidly and/or permanently. The push rod 36 can be impinged by spring force by means of a spring element 39. The spring force is in this case preferably directed in such a way that it forces the pressure piston 34 into the pressure cylinder 34 in order to provide pressurized fluid by means of the brake pressure source 4.

The transmission 38, which is provided in an operative connection between the electric engine 17 and the pressure piston 34, is provided with force transmission paths 40 and 41 which are mutually parallel to each other. A first of the force transmission path, in particular the force transmission path 40, extends through a first transmission shaft 42, and a second force transmission path, in particular the force transmission path 41, via a second transmission shaft 43. The transmission shafts 42 and 43 are preferably arranged rotatably at a distance parallel to each other. The transmission shafts 42 and 43 are respectively coupled via a coupling gear 44 or 45 to the drive shaft 37.

Figure 3:
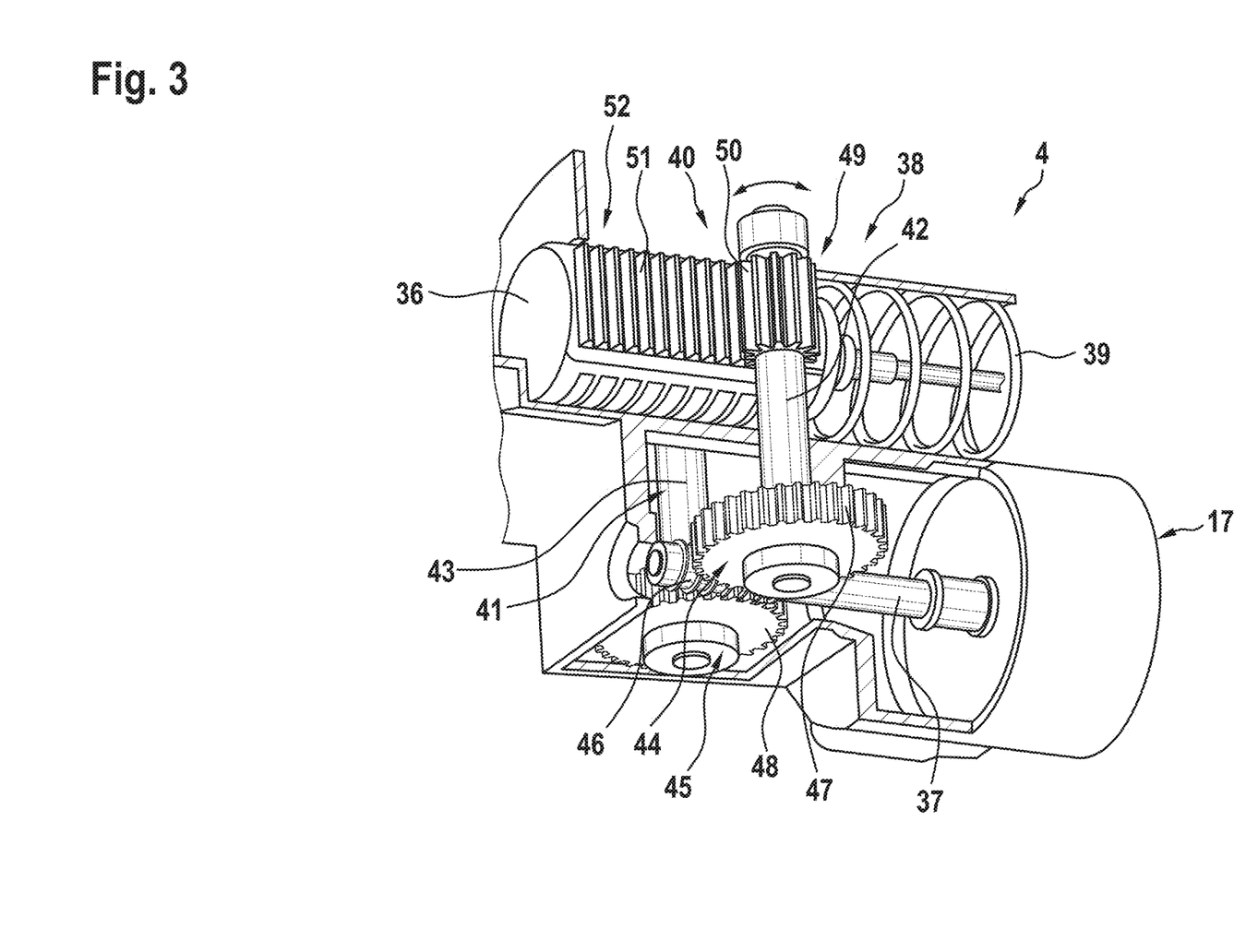
FIG. 3: another schematic representation of a region of a brake pressure source of the brake system.

As shown in FIG. 2 and FIG. 3, the coupling gears 44 and 45 are preferably designed as worm gears. They include a worm gear 46 as a common transmission element, which is rigidly coupled to the drive shaft 37 and/or formed on it. The worm gear 46 meshes with a toothed wheel 47 of the first transmission shaft 42 and a with a toothed wheel 48 of the second transmission shaft 43. Although both toothed wheels 47 and 48 mesh with the worm gear 46, they engage this gear from different sides, in particular from opposite sides.

The first transmission shaft 42 is coupled via a first translatory gear 49, and the second transmission shaft 43 is coupled via a second translatory gear, not shown here, to the pressure piston 34 or to the push rod 36. The first translatory gear 49 is in this case provided with a first toothed wheel 50 and the second translationary gear is provided with a second translationary gear, not shown here. The first toothed wheel 50 meshes with a first gear rack 51, and the second toothed wheel meshes with a second gear rack, not shown here.

Both gear racks, which is to say the first gear rack 51 and the second gear rack, are designed as a common gear rack 52 and they are provided with toothings that are located on the opposite sides of the gear rack 52. The toothed wheels, which is to say the first toothed wheel 50 and the second toothed wheel, engage the toothed rack 52 from different sides, in particular from opposite sides.

With such a configuration, it is possible to design the operative connection between the electric engine 17 and the pressure piston 34 of the brake pressure source 4 redundantly and to provide for this purpose a plurality of for transmission paths 40 and 41. In the event of a failure of one of the force transmission paths 40 and 41, pressurized fluid can still be provided reliably by means of the brake pressure source 4 in order to operate the brake system 1.

Figure 4:
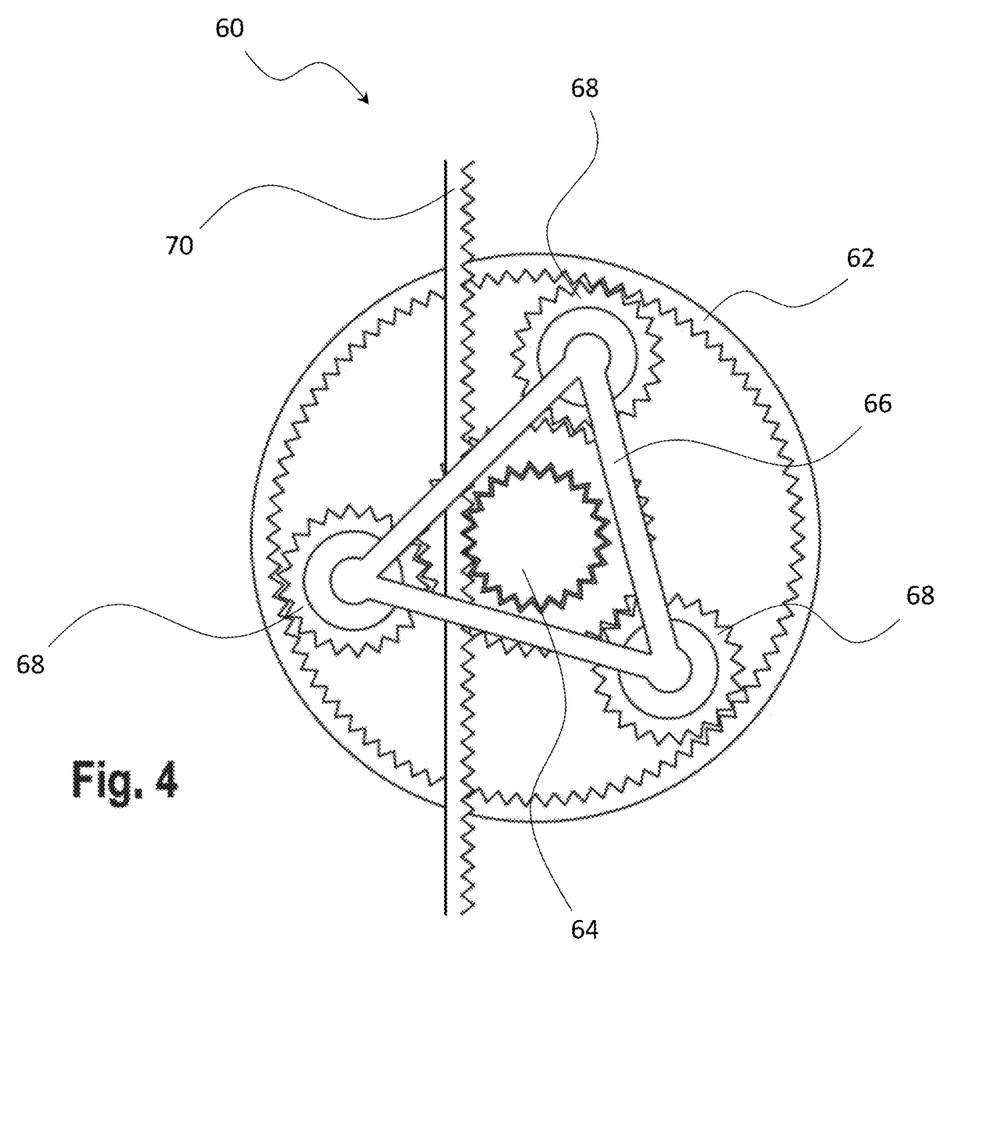
FIG. 4: a schematic representation of an epicyclic gearbox of the brake system.

FIG. 4 may show an exemplary embodiment of an epicyclic gearbox 60 of the brake system having a ring gear 62, and a sun wheel 64, as well as a planetary carrier 66 carrying a plurality of planetary wheels 68. Each of the planetary wheels 68 meshes with the ring gear 62 and the sun wheel 64. The sun wheel 64 is coupled to the pressure piston by a translationary gear 70, and may particularly be a push rod which is engaged on the push piston. The translationary gear 70 is provided with an internal toothing which meshes with the sun wheel 64, and with an external toothing which is meshing with the internal toothing.

The invention claimed is:

1. A brake system for a motor vehicle, comprising:
a brake pressure source that provides a brake pressure to at least one wheel brake,
the brake pressure source further comprising:
a pressure cylinder;
a pressure piston, linearly arranged in a displaceable manner in the pressure cylinder; and
a motor for displacing the pressure piston within the pressure cylinder, the motor having a drive shaft coupled to the pressure piston via a transmission, wherein the transmission, which is in operative connection with the motor and the pressure piston, is provided with two force transmission paths arranged at least partially parallel to each other,
wherein a first of the force transmission paths extends via a first transmission shaft and a second transmission path extends via a second transmission shaft,
wherein the first transmission shaft is coupled via a first translatory gear and the second transmission shaft is coupled via a second translator gear to a push rod engaged on the pressure piston,
wherein the first translatory gear includes a first toothed wheel connected to the first transmission shaft and a first gear rack meshing with the first toothed wheel, and the second translator gear includes a second toothed wheel connected to the second transmission shaft and a second gear rack meshing with the second toothed wheel, and
wherein the first gear rack and the second gear rack are designed as a common gear rack, wherein a toothing of the first gear rack is arranged on a first side of the common gear rack and a toothing of the second gear rack is arranged on a second side of the common gear rack different from the first side.

2. The brake system according to claim 1, wherein the transmission includes an epicyclic gearbox having a ring gear, a sun gear, and a planetary carrier carrying a plurality of planetary gears, wherein each of the planetary gears on one side meshes with the ring gear, and on the other side meshes with the sun gear.

3. The brake system according to claim 2, wherein the sun gear is coupled to the pressure piston by means of a translatory gear.

4. The brake system according to claim 3, wherein the translatory gear is provided with an internal toothing of the sun gear, and with an external toothing which meshes-with the internal toothing of the sun gear.

5. The brake system according to claim 1, wherein the first transmission shaft and the second transmission shaft are arranged parallel to each other.

6. The brake system according to claim 1, wherein the first transmission shaft and the second transmission shaft are mutually coupled to the drive shaft via a coupling gear.

* * * * *